United States Patent
Moser et al.

(10) Patent No.: US 10,199,698 B2
(45) Date of Patent: Feb. 5, 2019

(54) METHOD FOR THE PRODUCTION OF A COOLING PLATE FOR A COOLING DEVICE OF A BATTERY

(71) Applicant: Mahle International GmbH, Stuttgart (DE)

(72) Inventors: Michael Moser, Ellwangen (DE); Dominique Weinmann, Rottenburg (DE); Alexandra Schnaars, Marbach (DE)

(73) Assignee: Mahle International GmbH (DE)

( * ) Notice: Subject to any disclaimer, the term of this patent is extended or adjusted under 35 U.S.C. 154(b) by 356 days.

(21) Appl. No.: 14/965,867

(22) Filed: Dec. 10, 2015

(65) Prior Publication Data

US 2016/0172725 A1 Jun. 16, 2016

(30) Foreign Application Priority Data

Dec. 11, 2014 (DE) .................. 10 2014 225 532

(51) Int. Cl.
*H01M 8/02* (2016.01)
*B29C 43/20* (2006.01)
(Continued)

(52) U.S. Cl.
CPC ......... *H01M 10/6554* (2015.04); *B29C 70/46* (2013.01); *B30B 15/065* (2013.01);
(Continued)

(58) Field of Classification Search
CPC ..... B29C 43/00; B29C 43/006; B29C 43/184; B29C 31/042; B29C 31/044; B29C 31/045; B29C 31/06; B29C 31/063; B29C 31/08; B29C 2045/14188; B29C 45/0005; B29C 70/00; B29C 70/68; B32B 27/12; B32B 27/32; B32B 5/024; B32B 43/003;
(Continued)

(56) References Cited

U.S. PATENT DOCUMENTS 6,132,669 A * 10/2000 Valyi ............... B29C 31/042
264/266
2013/0071720 A1* 3/2013 Zahn .................. H01M 2/1077
429/120
2013/0344362 A1 12/2013 Raisch et al.

FOREIGN PATENT DOCUMENTS

DE 102008059952 A1 6/2010
DE 102011002415 A1 7/2012
(Continued)

OTHER PUBLICATIONS

German Search Repot for DE-102014225532.5, dated Oct. 29, 2015.
English abstract for DE-102008059952.
English abstract for DE-102011052513.

*Primary Examiner* — Jun Yoo
(74) *Attorney, Agent, or Firm* — Fishman Stewart PLLC

(57) ABSTRACT

A method for producing a cooling plate may include the steps of: providing a pressing tool including a die and a stamp, wherein the die and the stamp define a negative shaped profile of the cooling plate to be produced; arranging at least one of a fiber woven fabric and a fiber scrim in the die; at least one of applying and introducing a melt of a thermoplastic plastic on the at least one of the fiber woven fabric and the fiber scrim to form an organic sheet; and shaping the organic sheet into a cooling plate shaped part via pressing the stamp onto the organic sheet arranged in the die.

20 Claims, 2 Drawing Sheets

(51) Int. Cl.
  *H01M 10/6554* (2014.01)
  *H01M 10/6556* (2014.01)
  *B29C 70/46* (2006.01)
  *B30B 15/06* (2006.01)
  *B30B 15/08* (2006.01)
  B29L 31/34 (2006.01)
  B29C 51/08 (2006.01)
  B29C 51/26 (2006.01)
  B29C 51/32 (2006.01)

(52) U.S. Cl.
  CPC ......... *B30B 15/08* (2013.01); *H01M 10/6556* (2015.04); *B29C 51/082* (2013.01); *B29C 51/261* (2013.01); *B29C 51/267* (2013.01); *B29C 51/32* (2013.01); *B29L 2031/3468* (2013.01); *H01M 2220/20* (2013.01)

(58) Field of Classification Search
  CPC .. H01M 10/625; H01M 10/65; H01M 2/1061; H01M 2/1077; H01M 8/0254; H01M 8/0228; H01M 8/0221
  See application file for complete search history.

(56) References Cited

FOREIGN PATENT DOCUMENTS

| | | |
|---|---|---|
| DE | 102011052513 A1 | 2/2013 |
| EP | 0423676 A2 | 4/1991 |
| GB | 2349599 A | 11/2000 |

\* cited by examiner

METHOD FOR THE PRODUCTION OF A COOLING PLATE FOR A COOLING DEVICE OF A BATTERY

CROSS-REFERENCE TO RELATED APPLICATIONS

This application claims priority to German Patent Application No. 10 2014 225 532.5, filed Dec. 11, 2014, the contents of which are hereby incorporated by reference in their entirety.

TECHNICAL FIELD

The invention relates to a method for the production of a cooling plate for a cooling device of a battery. The invention further relates to a cooling plate produced by means of the method presented above. The invention further concerns a cooling device for cooling a battery, wherein the cooling device comprises two cooling plates fastened to one another and produced by means of the method presented above.

BACKGROUND

Rechargeable battery systems for electric vehicles with purely electrical drive and for hybrid vehicles and vehicles with fuel cell drive are the subject of current research. At present, in the said types of vehicle lithium-ion batteries are preferably used, which are distinguished by a high energy density and an only weakly developed undesired memory effect. The capability of a rechargeable battery to supply reliably with electrical energy various electrical consumers installed in motor vehicles depends to a considerable extent on the thermal conditions prevailing in the environment of the battery.

Thermally well-defined environmental conditions are of great importance for a reliable and interference-free operation of the batteries—this applies not only for the said lithium-ion-based batteries, but generally for any rechargeable battery systems. In view of the considerable temperature fluctuations occurring for instance in a motor vehicle under normal operating conditions, this means that these fluctuations must be compensated by suitable temperature control devices coupled thermally to the battery, in order to keep the environmental temperature of the battery—and therefore also the temperature of the battery itself—within a temperature interval specified by the manufacturer.

Against this background, cooling devices are known from the prior art with metallic cooling plates, which contains a cooling duct structure, which in turn is able to be flowed through by a cooling means. The desired cooling effect is achieved by thermal interaction of the cooling means with the battery which is to be temperature-controlled. A heating function can also be integrated into the cooling device in a suitable manner, which heating function may be realized for example by means of electrical PTC heating elements.

As both the housing of the battery which is to be temperature-controlled and also the cooling plates are produced from a metal, the risk exists in conventional cooling devices that undesired electrical creepage currents can form between the housing of the battery and the cooling plates. In extreme cases, for instance in the formation of an electrical short circuit between battery and cooling device, such high electrical currents can even flow that they lead to a damage to the battery or to the cooling device. Independently thereof, with the use of metals as material system for the cooling plates, also the minimum requirements with regard to diffusion resistance of the cooling device are often not fulfilled.

It is therefore known from the prior art to arrange at the interface between cooling plate of the cooling device and the battery housing of the battery an electrical insulation layer of an electrically insulating material with high thermal conductivity. In particular, the use of a film of plastic or a silicone layer is known.

Against this background, DE 10 2008 059 952 B4 discloses a battery with several battery cells and a generic cooling device for cooling the battery cells. A metallic base body of the cooling device is equipped with an electrically insulating insulation layer. This is an injection-moulded layer of a plastic injected onto the base body.

The not insignificant effort in terms of process technology for applying such an electrical insulation onto the cooling plate of the cooling device or onto the battery housing of the battery which is to be cooled proves to be a disadvantage in the production of such electrical insulation layers. This leads typically to a considerable cost increase in the production of the cooling device.

SUMMARY

It is therefore an object of the present invention to indicate an improved embodiment for a production method for a cooling plate, which enables a simplified and therefore cost-efficient production of such a cooling plate.

The said problem is solved by the subject of the independent claims. Preferred embodiments are the subject of the dependent claims.

The basic idea of the invention is accordingly not to produce a cooling plate of a metal for use in a cooling device, but rather instead to manufacture a fibre-matrix semi-finished product—known to the specialist in the art as a so-called "organic sheet". Such an organic sheet comprises a fibre woven fabric or a fibre scrim which is embedded into a thermoplastic plastic matrix. As the thermoplastic plastic of the plastic matrix per se has the desired electrical insulation characteristics with, at the same time, high thermal conductivity, the method step of applying an electrical insulation layer onto the actual cooling plate, as would be necessary in conventional cooling plates made of metal, is dispensed with. Furthermore, in the method which is presented here, all essential production steps are carried out in the die of a pressing tool.

In a first method step a) of the method according to the invention presented here, therefore a pressing tool is provided with a die and a stamp, which are both constructed as negative shaped parts for the cooling plate which is to be manufactured in the course of the production method. For this, the die and stamp can both have respectively a shell-like, in particular a half-shell-like, geometry so that in the course of a pressing process which is still to take place with the pressing tool a cooling plate is produced with a likewise shell-like, in particular half-shell-like, geometry.

In a second step b), a fibre woven fabric or a fibre scrim is arranged in the die, which serves as starting material for the organic sheet which is to be produced. The fibre woven fabric/fibre scrim can be introduced into the die here for instance with the use of a suitable roll arrangement.

In a third step c), a melt of a thermoplastic plastic is then applied or respectively introduced onto/into the fibre woven fabric/fibre scrim and in this way the organic sheet is produced.

In a fourth step (d), this organic sheet is formed into a cooling plate shaped part by pressing of the stamp onto the organic sheet arranged in the die. By means of such a pressing process, the desired geometric shape provided by the two negative shaped parts—i.e. stamp and die—is given to the organic sheet.

It proves to be particularly advantageous here that the organic sheet, formed by means of introducing a thermoplastic plastic into the die, has a suitable temperature, at least for a longer period of time, for the hot forming by means of pressing. A costly, renewed heating of the organic sheet to carry out the pressing process can therefore be dispensed with in the method which is presented here. This leads to a considerable simplification of the individual method steps, whereby cost advantages can be achieved in the production of the cooling plate. As the organic sheet has electrically insulating characteristics, the application of a separate, electrical, insulation for instance in the form of an already mentioned film of plastic, which is usual in metallic cooling plates, is likewise not necessary. This also simplifies the production of the cooling plate.

In a preferred embodiment, the die and the stamp can be provided with a shell-like, in particular half-shell-like, surface geometry, so that the cooling plate shaped part formed in step d) from the organic sheet has the geometric shaping of a shell, in particular of a half shell. Such a shell-like geometry permits the production of a cooling device with two or several cooling plates in a flat type of construction.

In a further preferred embodiment, the die and the stamp are provided with a surface geometry which reproduces a duct structure which is to be formed in the cooling plate. This duct structure is co-formed in the cooling plate shaped part during the shaping according to step d). It shall be understood that such a duct-like surface structure can be readily combined with the shell-like surface structure of the organic sheet explained above. In this case, a cooling plate shaped part, constructed in the manner of a shell or respectively half shell, with a duct structure integrated therein, is produced.

In a preferred embodiment, the steps a) to d) of the method according to the invention are carried out in the die of the pressing tool. For this, in step a) firstly the fibre woven fabric or respectively fibre scrim is inserted into the die of the pressing tool. Subsequently in step b) the melt of thermoplastic plastic can then be introduced into the die. It is conceivable here to supplement the pressing tool by an extruder with a nozzle-like outlet or by another suitable device with a heating duct system, in order to introduce the melt for the fibre woven fabric or respectively fibre scrim into the die of the pressing tool. The carrying out of all the method steps essential to the invention in the pressing tool has the result that the expenditure in terms of process technology for carrying out the method can be distinctly reduced.

In an advantageous further development of the method according to the invention, this can comprise an additional method step e), in which the cooling plate shaped part, shaped in step e), is cooled below a predetermined temperature threshold value. In this way, the material of the cooling plate shaped part is sufficiently hardened, before the desired outer contour is produced in it by means of a punching process.

Particularly expediently, the additional method step e) explained above can likewise be carried out in the cutting tool comprising the die. This measure also leads to a further simplification of the process in the production of the cooling plate or respectively of the cooling plate shaped part.

In a further preferred embodiment, the method according to the invention can comprise a further additional method step f), according to which a cooling plate is punched out from the cooling plate shaped part by means of a cutting tool. By means of such a punching process, the final outer dimensions of the cooling plate are established. Particularly expediently, step f) can also be carried out in the die of the pressing tool.

In a further preferred embodiment, the thermoplastic plastic can be applied in step c) in granular form onto the fibre woven fabric/fibre scrim or respectively can be introduced therein. This results in an advantageous, particularly uniform distribution of the melt in the fibre woven fabric or respectively fibre scrim.

Polyamides or polyolefins are particularly suitable as material for the thermoplastic plastic. The former are distinguished by a high strength and high resistance with respect to organic solvents. The latter have a good chemical stability. Both plastics have, furthermore, the desired electrical insulation characteristics for use as a cooling plate.

In an advantageous further development of the invention, by means of the method according to the invention which is presented here, two cooling plates can be produced, which in a further additional method step are joined to one another such that they delimit a fluid duct having the duct structure.

In a further advantageous further development, two cooling plates, constructed in a shell-like, in particular half-shell-like manner and produced by means of the method explained above, are joined to one another in the region of their respective shell edge.

Particularly expediently, the two cooling plates can be joined to one another here in a substance-bonded manner, in particular by means of welding or by means of an adhesive connection.

The invention furthermore relates to a cooling plate produced by means of the method presented above for a cooling device for cooling a battery.

The invention further relates to a cooling device for cooling a battery, wherein the cooling device comprises two cooling plates fastened to one another and produced by means of the method presented above.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein the same reference numbers refer to identical or similar or functionally identical components.

BRIEF DESCRIPTION OF THE DRAWINGS

There are shown, respectively diagrammatically

DETAILED DESCRIPTION

Figure 1:
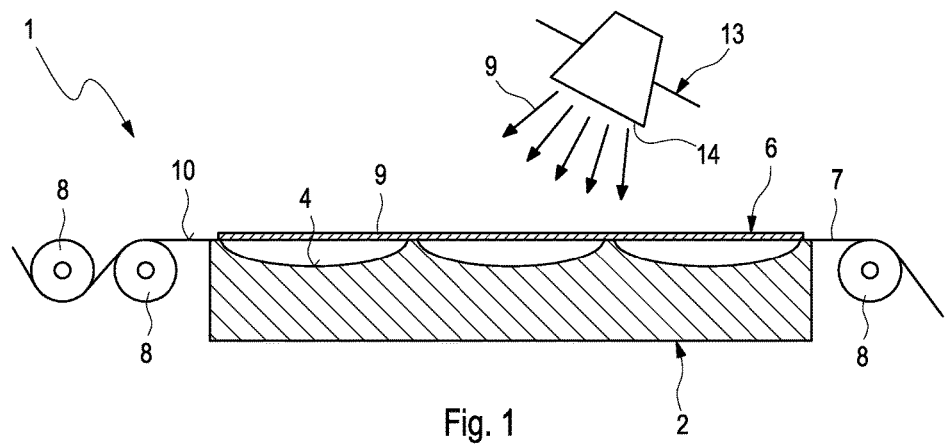
FIGS. 1 to 3 a pressing tool for carrying out the method according to the invention in the carrying out of various method steps, FIG. 4 a cooling plate produced by means of the method according to the invention, in separate illustration, FIG. 5 a cooling device with two cooling plates of FIG. 4 joined to one another.
Figure 2:
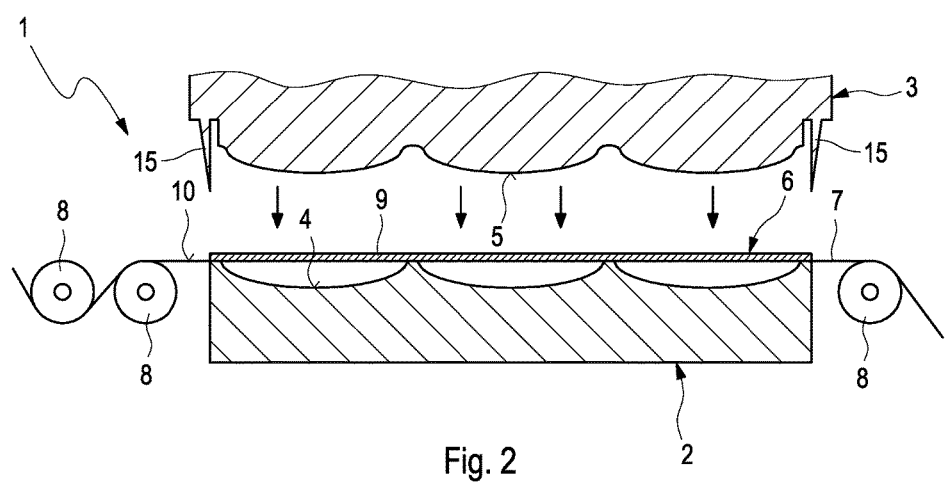

FIGS. 1 and 2 show in diagrammatic representation a pressing tool 1, in which the method according to the invention is carried out. The pressing tool 1 comprises a die 2 and a stamp 3 which is movable relative to the die 2. The die 2 has an upper side 4 facing the stamp 3, which upper side has the geometric shape of a shell. In particular, the upper side 4 can have the geometry of a half shell. The underside 5 of the stamp 3 facing the die 2 has a surface geometry corresponding to the upper side 4 of the die 2. The die 2 and the stamp 3 are provided in step a) of the method according to the invention and form together two negative shaped parts for an organic sheet 6 which is to be produced by the use of the method according to the invention.

As FIGS. 1 and 2 show, both the die 2 and the stamp 3 of the pressing tool 1 can be provided with a surface geometry which reproduces a duct structure 12 which is to be formed in the cooling plate which is to be manufactured. This duct structure 12 is then co-formed during the later shaping according to step d) in the cooling plate shaped part 11 produced by means of a pressing process. It shall be understood that such a duct-like surface structure can be readily combined with the above-mentioned shell-like surface contour.

In method step b) a fibre woven fabric or a fibre scrim—designated uniformly in the figures by the reference number 7 and respectively having a plurality of fibres—is arranged in the die 2. The fibre woven fabric/fibre scrim 7 can be introduced into the pressing tool 1 by rolls 8 by means of a roll arrangement indicated only roughly diagrammatically in FIG. 1.

In method step c), a melt 9 of a thermoplastic plastic is then introduced into the fibre woven fabric/fibre scrim 7, i.e. the fibre woven fabric/fibre scrim 7 is impregnated with such a melt 9. Alternatively or additionally, the melt 9 can also be applied in the sense of a wetting onto a surface 10 of the fibre woven fabric/fibre scrim 7. In both cases, an extruder—illustrated only roughly diagrammatically in FIG. 1 and designated by 13—is provided on the pressing tool 1 with a nozzle-like outlet 14, in which the melt 9 is heated and is injected into the die 3 containing the fibre woven fabric or respectively fibre scrim 7. Alternatively to the extruder 13, another suitable tool, for example with a heating duct system (not shown) can also be used, in order to introduce the melt 9 into the die 2.

Preferably, the thermoplastic plastic is applied in step c) in granular form onto the fibre woven fabric/fibre scrim or respectively introduced into the latter. This measure brings about a particularly uniform distribution of the melt in the fibre woven fabric or respectively fibre scrim. Polyamides or polyolefins are particularly suitable as material for the thermoplastic plastic. Both material systems have the desired electrical insulating characteristics. By the method step c), the fibre woven fabric/fibre scrim 7 is completed to form the organic sheet 6.

Figure 3:
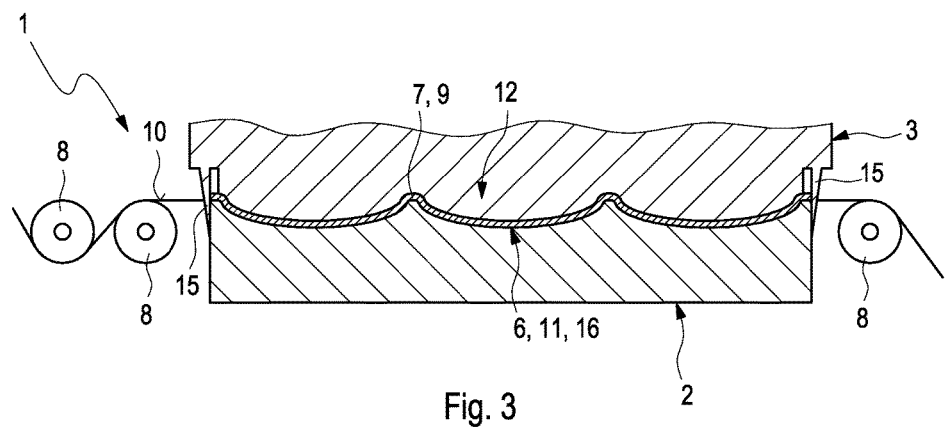
Figure 4:
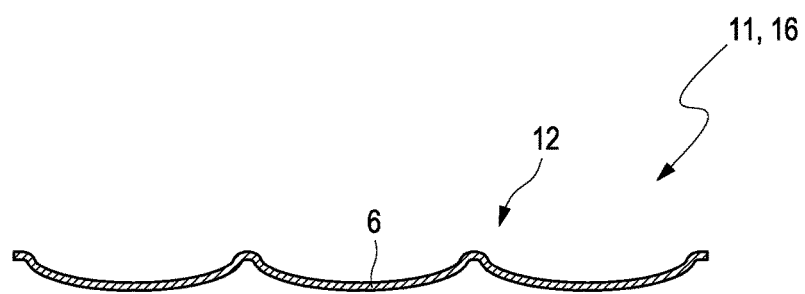

In method step d), which is illustrated diagrammatically in the illustration of FIG. 3, the organic sheet 6 is shaped into a cooling plate shaped part 11 by means of a pressing process. This takes place by pressing of the stamp 3 of the pressing tool 1 onto the organic sheet 6 arranged in the die 2, as illustrated diagrammatically in FIG. 3. The cooling plate shaped part 11, formed in this way and shown in a separate illustration in FIG. 4, can be further processed for use as a cooling plate 16 of a cooling device 20. For this, the method according to the invention comprises an optional method step, in which the final cooling plate 16 is punched out from the cooling plate shape part 11 by means of a cutting tool 15. By means of such a punching process, the final outer dimensions and the edge contour of the cooling plate 16 are established. In the example of the figures, this optional step is also carried out in the die 2 of the pressing tool 1. For this purpose, the cutting tool 15 necessary for the punching out of the cooling plate 16 from the cooling plate shaped part 11 is provided directly on the pressing tool 1. In a variant of the example, however, a separate cutting tool can also be used (not shown).

Before the cooling plate 16 is punched out from the cooling plate shaped part 11, the latter can be cooled below a predetermined temperature threshold value in particular by means of a cooling system which is not illustrated in the figures. In this way, the material of the cooling plate shaped part 11 is sufficiently hardened before the punching out of the cooling plate 16 takes place.

Figure 5:
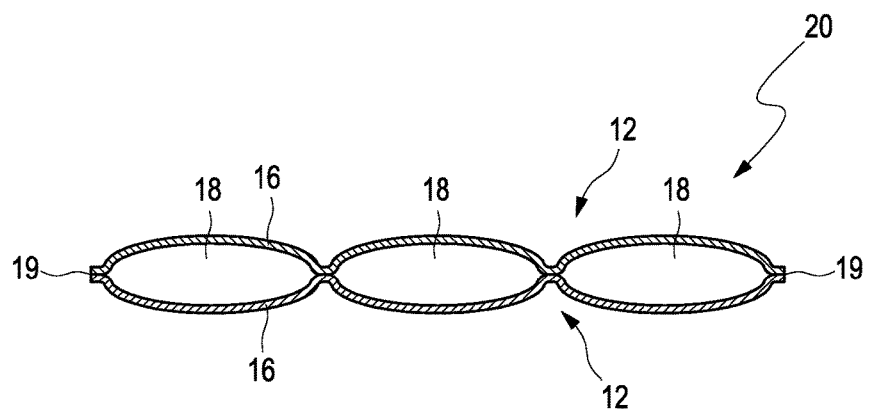

It shall be understood that the method discussed above can also be used for the production of two cooling plates 16. These two cooling plates 16 can then be joined to one another, as shown in FIG. 5 in a further method step, such that they delimit a fluid duct 18 comprising the duct structure 12. For this, the two cooling plates 16, constructed in the manner of a shell or respectively in the manner of a half shell, as illustrated in FIG. 5 can be joined to one another by means of respective shell edges 19 in a substance-bonded manner, for example by means of welding or soldering. Alternatively thereto, an adhesive connection is also conceivable. The two cooling plates 16 in the state when joined to one another, shown in FIG. 5, form a cooling device 20, the fluid duct 18 of which, including its duct structure 12, can be flowed through by a cooling medium.

The invention claimed is:

1. A method for the production of a cooling plate for a cooling device of a battery, comprising the steps of:
    a) providing a pressing tool including a die and a stamp, wherein the die and the stamp define a negative shaped profile of a cooling plate shaped part to be produced;
    b) arranging at least one of a fibre woven fabric and a fibre scrim in the die after providing the pressing tool, wherein the at least one of the fibre woven fabric and the fibre scrim respectively has a fibre-matrix of a plurality of fibres;
    c) at least one of applying and introducing a melt of a thermoplastic plastic at least one of onto and into the at least one of the fibre woven fabric and the fibre scrim to form an organic sheet after arranging the at least one of the fibre woven fabric and the fibre scrim in the die, wherein the at least one of applying and introducing the melt of the thermoplastic plastic includes impregnating the at least one of the fibre woven fabric and the fibre scrim with the melt of the thermoplastic plastic to distribute the melt into the fibre-matrix of the at least one of the fibre woven fabric and the fibre scrim and form the organic sheet; and
    d) shaping the organic sheet into a cooling plate shaped part via pressing the stamp onto the organic sheet arranged in the die after the at least one of applying and introducing the melt of the thermoplastic plastic.

2. The method according to claim 1, wherein the die and the stamp have a shell-like surface geometry, and wherein step d) includes shaping the organic sheet into the cooling plate shaped part having a geometric shape of a shell.

3. The method according to claim 1, wherein at least one of the die and the stamp has a surface geometry of a duct-like surface structure for forming a fluid duct in the cooling plate, and wherein step d) further includes shaping the organic sheet into the cooling plate shaped part with a duct structure having a geometry defining a plurality of partial fluid ducts via pressing the stamp onto the organic sheet arranged in the die.

4. The method according to claim 1, wherein the steps a) to d) are performed in the die of the pressing tool.

5. The method according to claim 1, further comprising the step of:
   e) cooling the cooling plate shaped part below a predetermined temperature threshold value.

6. The method according to claim 5, wherein step e) includes cooling the cooling plate shaped part in the die.

7. The method according to claim 1, further comprising the step of:
   f) punching out a cooling plate from the cooling plate shaped part via a cutting tool.

8. The method according to claim 7, wherein step f) includes punching out the cooling plate from the cooling plate shaped part in the die.

9. The method according to claim 1, wherein step c) includes applying the thermoplastic plastic in a granular form to facilitate a uniform distribution of the melt of the thermoplastic plastic in the fibre-matrix of the at least one of the fibre woven fabric and the fibre scrim before said shaping the organic sheet into the cooling plate shaped part via pressing the stamp onto the organic sheet arranged in the die.

10. The method according to claim 1, wherein the thermoplastic plastic includes at least one of a polyamide and a polyolefin.

11. The method according to claim 1, further comprising repeating step b) to step d) to form another cooling plate shaped part, the method further including the step of joining the two cooling plate shaped parts to delimit a fluid duct for a fluid flow.

12. The method according to claim 11, wherein the two cooling plate shaped parts respectively have a geometry of a half shell and are joined to one another in a region of a shell edge.

13. The method according to claim 11, wherein joining the two cooling plate shaped parts includes bonding the two cooling plate shaped parts together via at least one of welding and adhesion.

14. The method according to claim 1, wherein step c) of the at least one of applying and introducing the melt of the thermoplastic plastic further includes covering a surface of the at least one of the fibre woven fabric and the fibre scrim with the melt of the thermoplastic plastic to form the organic sheet such that the fibre-matrix of the at least one of the fibre woven fabric and the fibre scrim is embedded in the thermoplastic plastic before said shaping the organic into the cooling plate shaped part via pressing the stamp onto the organic sheet arranged in the die.

15. A method for producing a cooling plate of a cooling device for a battery, comprising:
   providing a pressing tool including a die and a stamp, wherein the die and the stamp each have a negative shaped profile formed complimentary to a cooling plate shaped part to be produced;
   arranging at least one of a fibre woven fabric and a fibre scrim respectively having a fibre-matrix defined by plurality of fibres in the die after providing the pressing tool;
   introducing a melt of a thermoplastic on the at least one of the fibre woven fabric and the fibre scrim to form an organic sheet after arranging the at least one of the fibre woven fabric and the fibre scrim in the die, wherein introducing the melt of the thermoplastic includes impregnating the at least one of the fibre woven fabric and the fibre scrim with the melt of the thermoplastic to distribute the melt into the fibre-matrix of the at least one of the fibre woven fabric and the fibre scrim to form the organic sheet; and
   pressing the stamp onto the die having the organic sheet to shape the organic sheet and form a cooling plate shaped part after introducing the melt of the thermoplastic.

16. The method according to claim 15, wherein introducing the melt of the thermoplastic further includes covering the at least one of the fibre woven fabric and the fibre scrim with the melt of the thermoplastic such that the fibre-matrix of the at least one of the fibre woven fabric and the fibre scrim is embedded in the thermoplastic before said pressing the stamp onto the die to shape the organic sheet and form the cooling plate shaped part.

17. The method according to claim 15, wherein introducing the melt of the thermoplastic includes applying the thermoplastic in a granular form on the at least one of the fibre woven fabric and the fibre scrim to facilitate a uniform distribution of the melt in the fibre-matrix of the at least one of the fibre woven fabric and the fibre scrim.

18. The method according to claim 15, wherein the die and the stamp have a negative contour of part of a fluid duct, and wherein pressing the stamp onto the die to shape the organic sheet and form the cooling plate shaped part includes shaping the organic sheet into a duct structure to form the cooling plate shaped part with the duct structure integrated therein.

19. A method for the production of a cooling plate for a cooling device of a battery, comprising the steps of:
   providing a pressing tool including a die and a stamp, the die and the stamp defining a negative shaped profile of a cooling plate shaped part to be produced;
   forming an electrically insulating organic sheet after providing the pressing tool, wherein forming the electrically insulating organic sheet includes arranging at least one of a fibre woven fabric and a fibre scrim respectively defined by a plurality of fibres in the die, and distributing a melt of an electrical insulating thermoplastic plastic onto the at least one of the fibre woven fabric and the fibre scrim; and
   shaping the electrically insulating organic sheet into a cooling plate shaped part having an integrated fluid duct structure via pressing the stamp onto the electrically insulating organic sheet arranged in the die after forming the electrically insulating organic sheet.

20. The method according to claim 19, wherein distributing the melt of the electrical insulating thermoplastic plastic onto the at least one of the fibre woven fabric and the fibre scrim includes impregnating the at least one of the fibre woven fabric and the fibre scrim with the melt of the electrical insulating thermoplastic plastic and covering a surface of the at least one of the fibre woven fabric and the fibre scrim with the melt of the electrical insulating thermoplastic plastic before said shaping the electrically insulating organic sheet into the cooling plate shaped part.

* * * * *